Sept. 15, 1925.
E. F. ANDERSON
ELEVATING MECHANISM FOR HARVESTERS
Filed Aug. 26, 1921
1,553,584
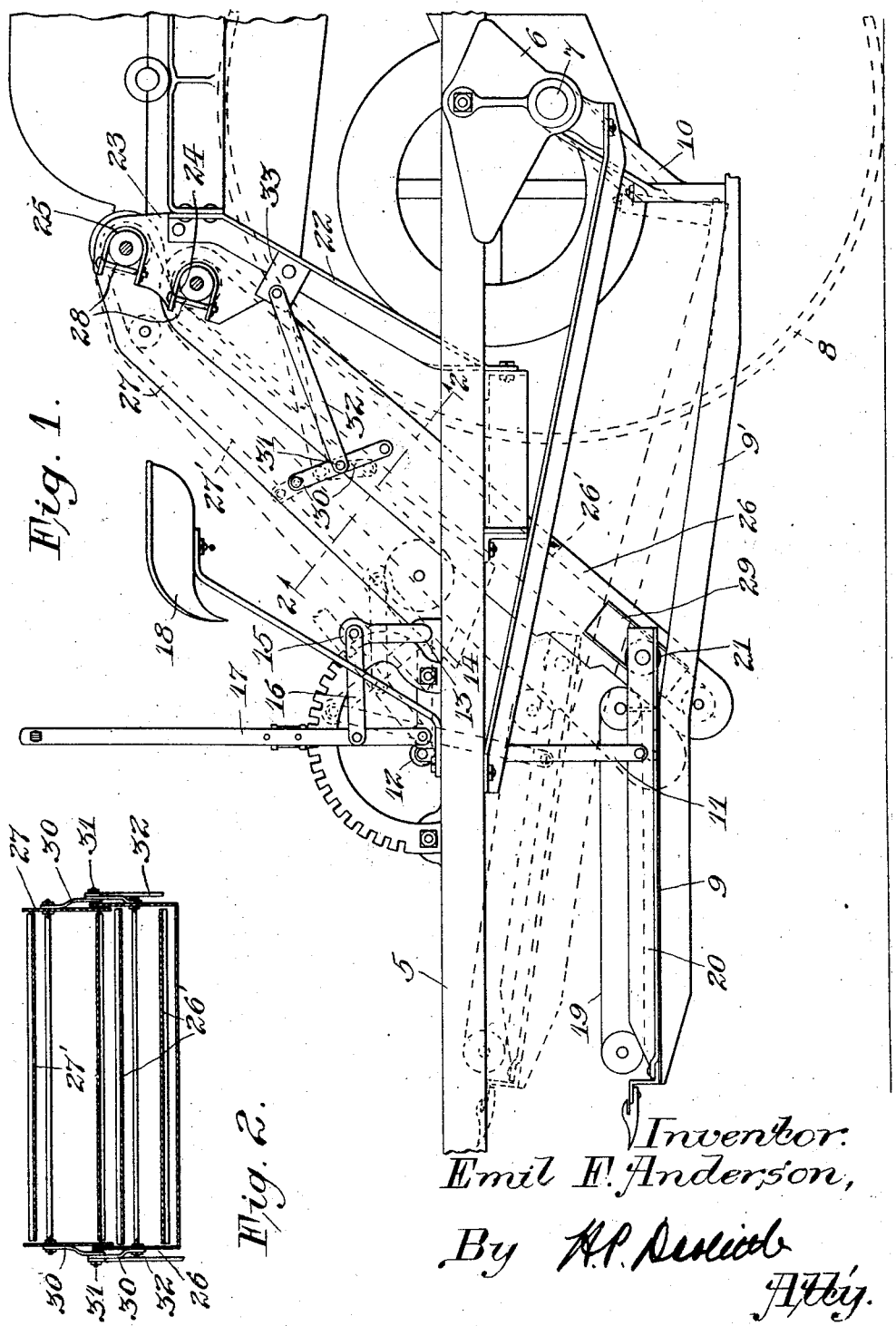

Patented Sept. 15, 1925.

1,553,584

UNITED STATES PATENT OFFICE.

EMIL F. ANDERSON, OF CHICAGO, ILLINOIS, ASSIGNOR TO INTERNATIONAL HARVESTER COMPANY, A CORPORATION OF NEW JERSEY.

ELEVATING MECHANISM FOR HARVESTERS.

Application filed August 26, 1921. Serial No. 495,657.

*To all whom it may concern:*

Be it known that I, EMIL F. ANDERSON, a citizen of the United States, residing at Chicago, in the county of Cook and State of Illinois, have invented certain new and useful Improvements in Elevating Mechanism for Harvesters, of which the following is a full, clear, and exact specification.

This invention relates to harvesters, but more particularly to the elevating mechanism for the same. The object of my invention is to provide an improved elevating mechanism.

A further object is to provide an elevating device in which the possibility of choking the same is entirely eliminated.

A further object is to provide a means for adjusting the upper and lower elevator aprons with respect to each other and simultaneously with the adjustment of the platform of the harvester. These and other objects are attained by providing means, such, for instance, as a toggle link mechanism connected to the main frame for adjusting the upper and lower aprons of the elevator when the platform is adjusted. In order that my invention may be clearly and fully disclosed, one embodiment thereof is shown in the accompanying drawings. It will be understood, however, that the form chosen for the purposes of illustration may be modified without departing from the spirit and scope of the appended claims.

In the drawings—

Fig. 1 is a side elevational view of a combined harvester thresher embodying my invention;

Fig. 2 is a cross sectional view taken on the lines 2—2 in Figure 1, looking in the direction of the arrows.

In these drawings I have shown my invention applied to a combined harvester and thresher of the type shown in the Patent to Bunting, No. 1,222,730, dated April 17, 1917, but it will be understood that the same is adaptable to any employment wherein this adjustability is required. The harvester thresher here shown comprises a main frame 5 mounted on the bracket 6 carried by the axle 7 mounted on the main driving wheels 8. Pivotally connected forward of the main axle 7 is the platform 9, which is connected to the main axle by the rearwardly extending frame member 9' and the brackets 10. The platform 9 is adjustably supported at its forward end by the connecting link 11 which in turn is connected to a forwardly extending arm 12 of a bell crank 13 fixed to the main frame 5 by the bracket 14. The bell crank 13 is provided with a normally vertically disposed arm 15 which has its free end connected by a link 16 to a hand operating lever 17 within easy reach of the operator on the seat 18.

The mechanism above described is the usual mechanism for adjusting the platform with respect to the harvester frame. The platform 9 is provided with the usual transversely disposed conveyor apron not shown and the longitudinally disposed cross apron 19. Securely fixed to the platform 9 is an angle bar 20 extending rearwardly and provided with a roller 21 adjacent the delivery end of the cross apron 19. It will be understood that a similarly positioned roller is placed on the other side for the purposes hereinafter more fully described. Secured to the main frame 5 are the inclined angle members 22 which have secured adjacent their upper ends elevator supporting brackets 23, provided with a slotted lower and upper opening 24 and 25 respectively adapted to receive and pivotally support the lower elevator frame 26 and upper elevator frame 27 respectively. It will be noted that these frames are adapted to be quickly detached from the main frame by the removal of the bolts 28. The free end of the lower elevator frame 26 is provided with longitudinally disposed rectangular shaped slots 29 adapted to receive the oppositely disposed rollers 21 in a manner to permit the elevator frame 26 to be guided in its movement from the full line position to the dotted line position when the platform 9 is adjusted by the operating lever 17. Pivotally attached to the lower elevator frame 26 and the upper elevator frame 27 are the toggle links 30, the inner free ends of these links being connected together at 31 with a third link 32 which in turn is pivotally connected to a bracket 33 fixed to the frame members 22. The elevator frames 26 and 27 are provided with the usual endless apron 26' and 27' respectively, shown in Figure 2.

It will be noted that as the toggle link is moved from the position shown in full line to that shown in dotted line, these endless aprons 26' and 27' are adjusted relatively closer to each other. In the operation of a harvester thresher of this type it will be understood that in the cutting of relatively long grain, the platform is normally adjusted to a horizontal position, in which position a considerable amount of straw is cut and elevated and the greatest amount of opening between the upper and lower conveyor aprons should be obtained in order to avoid choking of the elevating mechanism, while, on the other hand, when the platform is elevated to the position shown in dotted lines, the amount of straw is considerably lessened and in order to efficiently elevate the short straw cut it becomes necessary to adjust the upper and lower elevator canvases to positions in close proximity with respect to each other. It will therefore be noted that if the operating lever 17 be shifted from the position shown in full line to that shown in dotted line, the platform 19 is elevated and carries with it the lower elevator frame 26 by means of the rollers 21 engaging the slotted guides 29 in the side of the elevator frame 26. It will be further noted that as the frame 26 is swung from the position shown in full line to that shown in dotted line, the upper elevator frame 27 is adjusted relatively closer to the frame 26 by means of the toggle link connection 30 and 32, as clearly shown in Figure 1.

While one embodiment of this invention has been described herein, it will be understood that the form chosen for the purpose of illustration is susceptible of modification without departing from the spirit of my invention.

What I claim as my invention and desire to secure by Letters Patent is:

1. In a harvester, a main frame, a platform adjustably mounted thereon, upper and lower elevator frames pivotally carried by said main frame, the lower elevator frame being connected with said platform, and means for adjusting said upper and lower elevator frames with respect to each other.

2. In a harvester, a main frame, a platform adjustably mounted thereon, upper and lower elevator frames pivotally carried by said main frame, the lower elevator frame being connected with said platform, and means comprising a toggle link connection for adjusting said upper and lower elevator frames with respect to each other.

3. In a harvester, a main frame, a platform adjustably mounted thereon, upper and lower elevator frames pivotally carried by said main frame, and means for adjusting said platform and said elevator frames with respect to each other.

4. In a harvester, a main frame, a platform adjustably mounted thereon, upper and lower elevator frames pivotally carried by said main frame, and means for simultaneously adjusting said platform and said elevator frames with respect to each other.

5. In a harvester, a main frame, a platform adjustably mounted thereon, upper and lower elevator frames pivotally carried by said main frame, means for adjusting said platform and a toggle link mechanism for permitting simultaneous adjustment of said elevator frames with respect to each other when adjusting said platform.

6. In a harvester, a main frame, a platform adjustably mounted thereon, upper and lower elevator frames pivotally carried by said main frame, the lower elevator frame being connected to said platform, a lever for adjusting said platform, and means connected to said main frame for adjusting said elevator frames with respect to each other.

7. In a harvester, a main frame, a platform adjustably mounted thereon, upper and lower elevator frames pivotally carried by said main frame, the lower elevator frame being connected to said platform, a lever for adjusting said platform, and toggle link mechanism connected to said main frame for adjusting said elevator frames with respect to each other.

8. In a harvester, a main frame, a platform adjustably mounted thereon, upper and lower elevator frames pivotally carried by the said main frame, the lower elevator frame being slidably connected to said platform, a lever for adjusting said platform, and toggle link mechanism connected to said main frame for adjusting said elevator frames with respect to each other.

9. In a harvester, a main frame, a platform adjustably mounted thereon, a lower elevator frame pivotally carried by said main frame and slidably connected to said platform, an upper elevator frame pivotally carried by said main frame and adjustable with respect to said first mentioned elevator frame, and means connecting said elevator frames with said main frame for effecting an adjustment of said elevator frames with respect to each other.

10. In a harvester, a main frame, a platform adjustably mounted thereon, a lower elevator frame pivotally carried by said main frame and slidably connected to said platform, an upper elevator frame pivotally carried by said main frame and adjustable with respect to said first mentioned elevator frame, and means connecting said elevator frames with each other and with the said main frame for effecting an adjustment of said elevator frames with respect to each other.

11. In a harvester, a main frame, a platform mounted thereon for vertical adjustment, an elevator frame pivoted to said main frame and slidably connected to said platform, and means for simultaneously adjusting said platform and said elevator frame.

12. In a harvester, a main frame, a platform adjustably mounted thereon, an elevator frame pivoted to said main frame, oppositely disposed rollers secured to said platform and engageable with said elevator frame for slidably connecting said elevator frame to said platform, and means carried by said main frame for simultaneously adjusting the platform and elevator frame with respect to each other.

13. In a harvester, a main frame, a platform mounted thereon for adjustment in a vertical plane, an elevator frame pivoted to said main frame, said elevator frame provided with a slot adjacent each lower end thereof, means carried by said platform adapted to engage the slots in said elevator frame, and means carried by the main frame for cooperatively adjusting said elevator frame and said platform.

14. In a harvester, a main frame, a platform mounted thereon for adjustment in a vertical plane, an elevator frame pivoted to said main frame, said elevator frame provided with oppositely disposed slots positioned adjacent the free ends thereof, oppositely disposed rollers carried by said platform operatively engaging the slots in said elevator frame, and means carried by the main frame for cooperatively adjusting said elevator frame and said platform.

In testimony whereof I affix my signature.

EMIL F. ANDERSON.